Patented Sept. 25, 1934

1,974,917

UNITED STATES PATENT OFFICE 1,974,917

ESTERIFICATION OF DIETHYL-MALONIC ACID

Paul Halbig and Felix Kaufler, Munich, Germany, assignors to Dr. Alexander Wacker Gesellschaft fur Elektrochemische Industrie, G. m. b. H., Munich, Germany, a corporation No Drawing. Application August 19, 1933, Serial No. 685,959. In Germany September 12, 1932

7 Claims. (Cl. 260—106)

The object of the invention is the esterification of diethyl malonic acid. According to the usual methods, diethyl-malonic acid, for example, can only be esterified poorly and incompletely. "Diethyl-malonic acid does not react with alcohol in the presence of mineral acid at room temperature, and at higher temperatures diethylethyl acetate is produced." Beilstein 4th edition, 2nd volume, supplement, page 285.) An esterification which can be used industrially with higher aliphatic alcohols appears to be still less possible to effect in view of the lessened reaction ability to be expected and the higher boiling points.

It has now been found that diethyl-malonic acid can be esterified with comparative ease and with very good results with any monohydric aliphatic alcohol if the esterification is carried out by heating in the presence of a neutral water insoluble solvent for the basic ingredients forming an azeotropic mixture with water. Peculiarly, there is nearly no formation of carbonic acid. As solvents, benzine, benzene, halogenated hydrocarbons, ether and the like, may be used alone or mixed. The quantity of solvent is about equal to the quantity of alcohol. An amount of alcohol a little larger, for instance, 20%, than required according to theory for esterification of the acid, is sufficient. As catalyzers, sulphuric acid, hydrochloric acid, phosphoric acid, sulfonic acids, acid sulphuric acid esters, and similar substances can be employed.

The method is generally carried out in such a manner that the starting materials are heated to about the boiling point. The vapors, carrying water of reaction, are condensed in a column, the water separated and the remaining parts of the distillate are returned to the reaction vessel. When all the acid is esterified, the catalyzer is removed by washing or neutralization and the ester is obtained pure by distillation.

Example 1

160 grams diethyl-malonic acid, 150 grams absolute ethyl alcohol, 150 grams benzene, 16 grams concentrated sulphuric acid are distilled in a column until the calculated amount of water is separated; this takes approximately 24 hours. The temperature in the reaction liquid is between 70 and 80° C. The temperature of the vapor is 63 to 65° C. After condensing, it is neutralized with soda and fractionated in a vacuum. 198 grams, i. e., approximately 92% of theory, of pure diethyl-malonic acid diethyl ester, boiling point of 100° C. under a pressure of 12 mm. of mercury, were produced.

Example 2

160 grams diethyl-malonic acid, 175 grams butanol, 150 grams benzine of the boiling point 70 to 80° C., 16 grams concentrated sulphuric acid are distilled together. The temperature in the liquid is 80 to 100° C., and that in the head of the column 67 to 70° C. The calculated amount of water is distilled off within 10 hours. The residue in the flask is then neutralized against Congo red and fractionated. 253 grams, i. e., approximately 95% of theory, of diethyl-malonic acid dibutyl ester, boiling point of 143–146° C. under a pressure of 12 mm. of mercury were produced.

Example 3

Butanol, sulphuric acid and benzine are boiled together, so that the sulphuric acid reacts with the butanol to form butyl sulphuric acid. Then the diethyl-malonic acid is added and the further steps are the same as in Example 2.

The invention claimed is:

1. Method for the esterification of diethyl-malonic acid, comprising heating a mixture of the malonic acid and a monohydric aliphatic alcohol to about the boiling point in the presence of a neutral organic water-insoluble solvent forming an azeotropic mixture with water.

2. Method for the esterification of diethyl-malonic acid, comprising heating a mixture of the malonic acid and a monohydric aliphatic alcohol to about the boiling point in the presence of a neutral organic water-insoluble solvent forming an azeotropic mixture with water and a mineral acid catalyst.

3. Method for the esterification of diethyl-malonic acid, comprising heating a mixture of the malonic acid and a monohydric aliphatic alcohol to about the boiling point in the presence of a neutral organic water-insoluble solvent forming an azeotropic mixture with water, and removing water of reaction as formed.

4. Method for the esterification of diethyl-malonic acid with a monohydric aliphatic alcohol, comprising heating a mixture of the acid and an excess of the alcohol to about the boiling point in the presence of a neutral organic water-insoluble solvent forming an azeotropic mixture with water, and removing water of reaction as formed.

5. Method for preparing diethyl-malonic acid diethyl ester, comprising heating diethyl-malonic acid and ethyl alcohol to about the boiling point in a neutral organic water-insoluble solvent forming an azeotropic mixture with water.

6. Method for preparing a malonic acid ester, comprising heating a monohydric aliphatic alcohol and an inorganic acid in the presence of a neutral organic water-insoluble solvent forming an azeotropic mixture with water and heating the resulting product and the solvent with a malonic acid to form a malonic acid ester.

7. Method for preparing diethyl-malonic-acid-dibutyl ester, comprising heating butanol and sulphuric acid in the presence of a neutral organic water-insoluble solvent forming an azeotropic mixture with water, removing water of reaction as formed, and heating the resulting product and the solvent with diethyl-malonic acid.

PAUL HALBIG.
FELIX KAUFLER.